(12) United States Patent
Subrahmanya et al.

(10) Patent No.: US 8,744,383 B2
(45) Date of Patent: Jun. 3, 2014

(54) DYNAMIC ELECTROMAGNETIC RADIATION EMISSION CONTROL IN WIRELESS COMMUNICATION DEVICES

(75) Inventors: Parvathanathan Subrahmanya, San Diego, CA (US); Nitin Kasturi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 385 days.

(21) Appl. No.: 13/080,725

(22) Filed: Apr. 6, 2011

(65) Prior Publication Data
US 2012/0257657 A1    Oct. 11, 2012

(51) Int. Cl.
*H04B 1/02*    (2006.01)
*H04B 7/00*    (2006.01)

(52) U.S. Cl.
USPC ...................................... 455/127.1; 455/41.2

(58) Field of Classification Search
USPC ........... 455/414.1, 456.1, 41.2, 41.1, 69, 566, 455/127.1, 127.2
See application file for complete search history.

(56) References Cited

U.S. PATENT DOCUMENTS

| | | | |
|---|---|---|---|
| 7,499,722 B2* | 3/2009 | McDowell et al. | 455/522 |
| 8,417,296 B2* | 4/2013 | Caballero et al. | 455/566 |
| 2010/0279751 A1 | 11/2010 | Pourseyed et al. | |

FOREIGN PATENT DOCUMENTS

| | | |
|---|---|---|
| WO | 2006040663 A1 | 4/2006 |
| WO | 2009149023 A1 | 12/2009 |

OTHER PUBLICATIONS

International Search Report and Written Opinion—PCT/US2012/032646—ISA/EPO—Jun. 14, 2012.

* cited by examiner

*Primary Examiner* — Blane J Jackson
(74) *Attorney, Agent, or Firm* — Stanton Braden

(57) ABSTRACT

Methods and apparatus for active and passive dynamic electromagnetic radiation emission control in wireless devices by limiting transmit power in individual devices is disclosed. In various embodiments, electromagnetic radiation emissions from wireless devices are dynamically controlled using variable transmit power limits acquired through the use of RF ID/NFC tags that indicate transmit power limits, where such power limiting tags are embedded in clothing, furniture, etc., communication of transmit power limits over Bluetooth or other short range technologies, location-based transmit power limits, user input transmit power limits. Controlling the transmit power of mobiles as well as femtocells/access points for the purpose of minimizing SAR using variable transmit power limits is detailed.

13 Claims, 4 Drawing Sheets

DYNAMIC ELECTROMAGNETIC RADIATION EMISSION CONTROL IN WIRELESS COMMUNICATION DEVICES

BACKGROUND

1. Field

The present invention relates generally to wireless communications, and more specifically to limiting electromagnetic radiation emissions in wireless communications devices.

2. Background

Wireless communication systems are widely deployed to provide various types of communication content such as voice, data, and so on. These systems may be multiple-access systems capable of supporting communication with multiple users by sharing the available system resources such as bandwidth and transmit power. Examples of such multiple-access systems include code division multiple access (CDMA) systems, time division multiple access (TDMA) systems, frequency division multiple access (FDMA) systems, 3GPP Long Term Evolution (LTE) systems, 3GPP2 Ultra Mobile Broadband (UMB) systems, LTE Advanced, WirelessMAN-Advanced, and orthogonal frequency division multiple access (OFDMA) systems.

Increasing the amount of power transmitted in a system can increase the data throughput and transmission range of the device, enabling rich multimedia applications in wireless devices such as smartphones, WAN-WLAN gateways (e.g. MiFi) and tablets. Increased transmission range enables these applications to be used even at locations far away from cellular base stations or access points. Thus, increasing the maximum allowed transmit power of wireless devices is beneficial for user experience.

While increasing transmit power improves multiple-access communication system functionality and user experience, it also increases Radio Frequency (RF) radiation from the wireless device. Users and regulatory agencies are concerned about the deleterious effects of increased RF radiation on user health. Studies have been performed on the effects of RF radiation in relation to cancer, reproductive health and other illnesses. Regulatory agencies such as the FCC have imposed limits on RF radiation from mobile devices specified in terms of Specific Absorption Rate (SAR). SAR is a measure of the rate at which energy is absorbed by the body when exposed to an RF electromagnetic field. SAR is defined as the power absorbed per mass of tissue in units of watts per kilogram (W/kg). SAR is usually averaged either over the whole body, or over a small sample mass of tissue between 1 and 10 grams. The SAR value is then the maximum level measured in the affected body part over the stated mass. SAR is a function of the design of the wireless device, its placement with respect to the user's body, and the level of transmit power. Wireless devices currently limit their transmit power to a fixed value. For example, some devices use a limit of 24 dBm to satisfy SAR limits. Additionally, wireless device manufacturers also advise users to place the devices sufficiently far away from the body, such as 1 inch away from the head, in order to limit its SAR.

However, the traditional use of a fixed transmit power limit often results in the chosen transmit power limit being too high or too low for a particular individual user. The fixed power limit is typically chosen by a device manufacturer based on a statistical sampling of user physical characteristics and device placement near the body. The limit imposed may be too high for individual users including infants and children, pregnant women, elderly or persons with sensitive physical characteristics. A fixed transmit power limit may also be too high for habitual usage patterns such as transmitting background data at maximum power while the device is in close proximity to vital organs. For example, when a wireless device is kept in a person's pocket. Unlike voice-only mobile phones where users knew their phone was transmitting only while engaged in a call, users of wireless devices in later generation multiple-access communication systems may be neither aware of, nor warned by, the device of ongoing transmission activity due to high power background uploads, data syncing or other applications. Furthermore, unaware bystanders may be subject to "second-hand radiation" from devices owned by others.

Conversely, the fixed transmit power limit may be too low for an individual user. While setting a low transmit power limit ensures that the device will produce acceptable SAR for a wide range of usage scenarios, the limit may be too low for individual usage behavior. For example, a SAR limit set assuming a smartphone is placed next to the head is too low for a user who always uses a headset for voice calls in order to place his smartphone away from his body.

There is therefore a need in the art for a method for dynamic individual control of transmit power in wireless devices to limit electromagnetic RF radiation.

DETAILED DESCRIPTION

Figure 1:
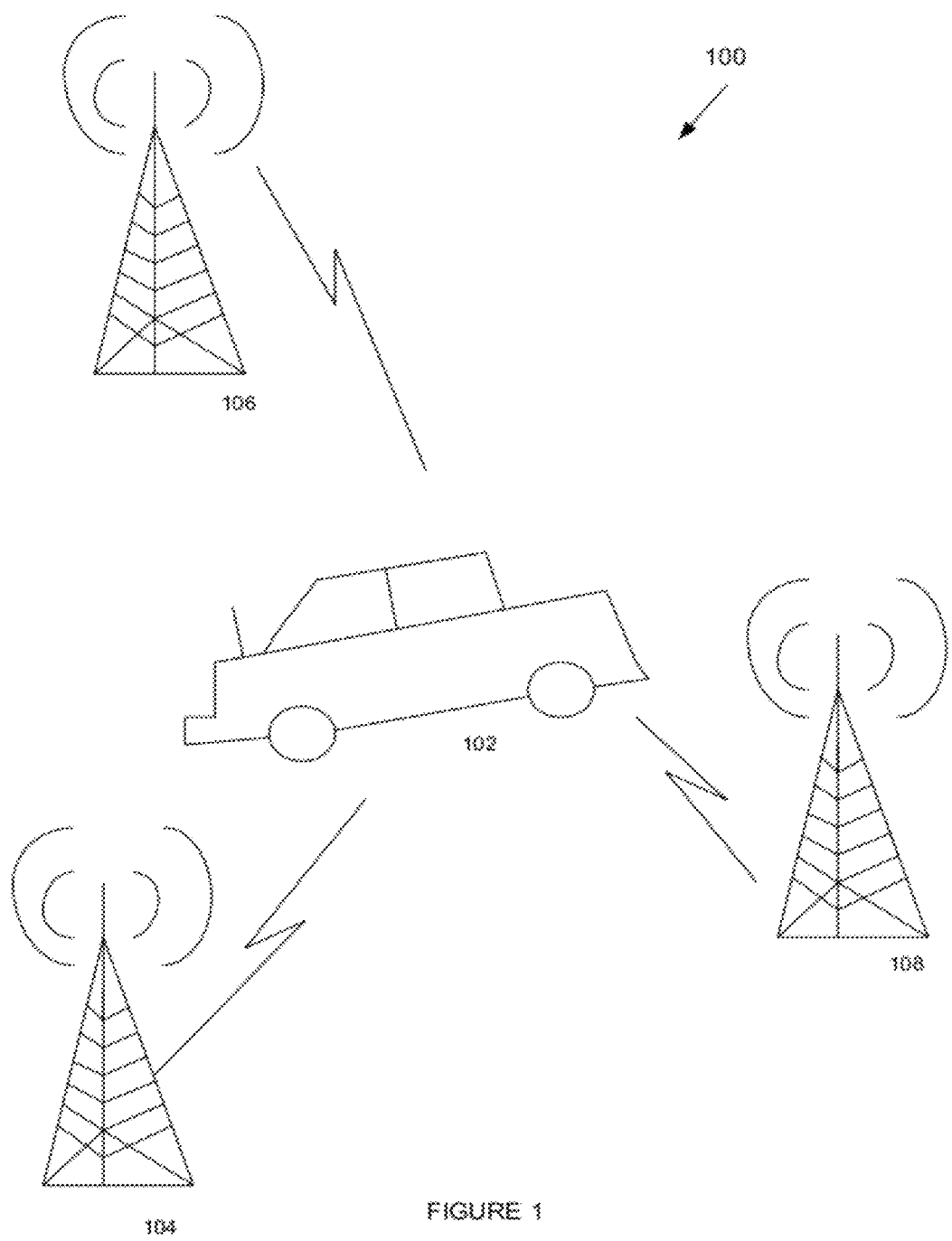
FIG. 1 is a diagram illustrating an example of a broadcast network in which dynamic electromagnetic radiation emission control in wireless devices can be used.

The word "exemplary" is used herein to mean "serving as an example, instance, or illustration." Any embodiment described herein as "exemplary" is not necessarily to be construed as preferred or advantageous over other embodiments.

The terms "mobile device", "wireless device" and "user equipment" as used herein refers to a wireless communication device such as a cellular telephone, smartphone, tablet, netbook, wireless terminal, user equipment, laptop computer, a femtocell, High Data Rate (HDR) subscriber station, access terminal, or other personal communication system (PCS) device. The device may be either mobile or stationary.

Methods and apparatus for active and passive dynamic electromagnetic radiation emission control in wireless devices by limiting transmit power in individual devices is disclosed. In one embodiment, wireless devices are capable of recognizing transmit power limits in Radio Frequency Identification (RF ID) tags. The tags may be embedded with information on allowed transmit power levels. Tags that indicate lower transmit power limits could be worn or embedded in articles of clothing near vital organs such as a belt, a trouser or shirt pocket, hat, underwear, etc. or in furniture such as infant cribs. Tags that indicate higher transmit power limits could be embedded near charging stations or other areas which are located at far distances from users' bodies. Upon detection of RF ID/NFC tags, transmit power limits are adjusted as indicated by the tag. Optionally, the user may be notified of a change in the current transmit power limit indicated by the tag and have an opportunity to allow or disallow a transmit power level limit change.

In another embodiment, wireless devices may observe transmit power limits based on their Global Positioning System (GPS) location. Locations such as hospitals, day care centers, and the like may be subject to reduced transmit power level limits.

In another embodiment, wireless devices are equipped with sensors for determining proximity to organic matter. Human proximity detection may be based on one or more of infrared sensors, capacitance sensor, resistive sensor, etc. Transmit power may be limited based on proximity. Modern wireless devices often already include a number of suitable sensors for various applications, while others may be incorporated in wireless devices for the specific purpose of proximity detection.

In another embodiment, transmit power limits are actively received by the wireless device over short-range, low power technologies such as Near Field Communications (NFC) or Bluetooth. Child-care centers, hospitals, or any other sensitive areas may employ this technique.

In yet another embodiment, a wireless device comprises a menu feature for setting transmit power levels at the user's discretion. Use of these techniques allows wireless devices to dynamically adjust an appropriate amount of transmit power in any situation while maximizing data throughput, coverage, and user experience.

FIG. 1 is a diagram illustrating an example of a wireless communications network in which dynamic electromagnetic radiation emission control can be used. As seen in FIG. 1, wireless communications network 100 includes multiple base stations 104, 106 and 108 for transmitting wireless communications signals. Signals and data can be broadcast by base stations 104, 106 and 108 to supply user content and information. For example, streaming video, games or data for other applications may be delivered over the wireless network. A wireless device, or User Equipment (UE) 102 receives the data for consumption by the user. In this example, the receiver 102 is depicted as hosted by a car. However, receiving station 102 is limited as such, and can also represent, for example, a person, another mobile entity/device, or a stationary entity/device. Furthermore, the receiver can represent a computer, a laptop computer, a telephone, a mobile telephone, a personal digital assistant (PDA), a netbook, a tablet, an audio player, a game console, a camera, a camcorder, an audio device, a video device, a multimedia device, a component(s) of any of the foregoing (such as a printed circuit board(s), an integrated circuit(s), and/or a circuit component(s)), or any other device capable of supporting dynamic electromagnetic radiation emission control. A host system can be stationary or mobile, and it can be a digital device.

Figure 2:
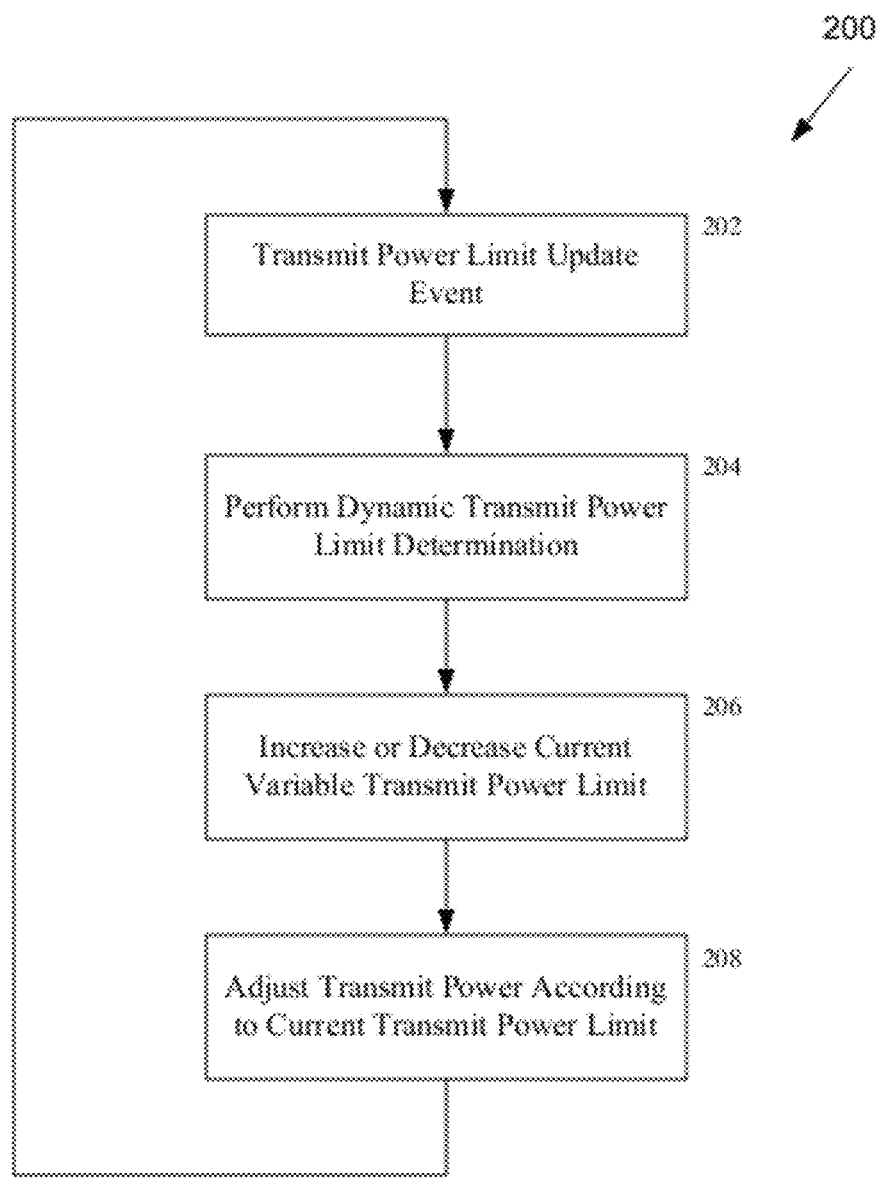
FIG. 2 is an exemplary high level overview flowchart illustrating dynamic electromagnetic radiation emission control.

FIG. 2 is an exemplary high level overview flowchart illustrating dynamic electromagnetic radiation emission control. Control flow begins in step 202 upon the occurrence of a transmit power limit update event. A transmit power limit update event may be simply periodic; occur upon receiving a power control command; at each channel estimation; during a location change of a predetermined magnitude; when a sort range signal is received; or any other appropriate trigger for updating a current transmit power limit. Control flow proceeds to step 204.

In step 204, a dynamic, or variable, transmit power limit is determined by an examination of factors that may cause the transmit power limit to change. Dynamic transmit power limit determination is detailed in FIG. 3. Control flow proceeds to step 206.

In step 206, the current transmit power limit may be increased or decreased, i.e. updated, if a new transmit power limit has been determined in step 204. Control flow proceeds to step 208.

In step 208, the transmit power of the wireless device is adjusted if the current transmit power limit has been updated in step 206. Thus, transmit power may be continuously adjusted even if the transmit power limit does not change. Control flow returns to step 202 upon the occurrence of the next transmit power update event.

Figure 3:
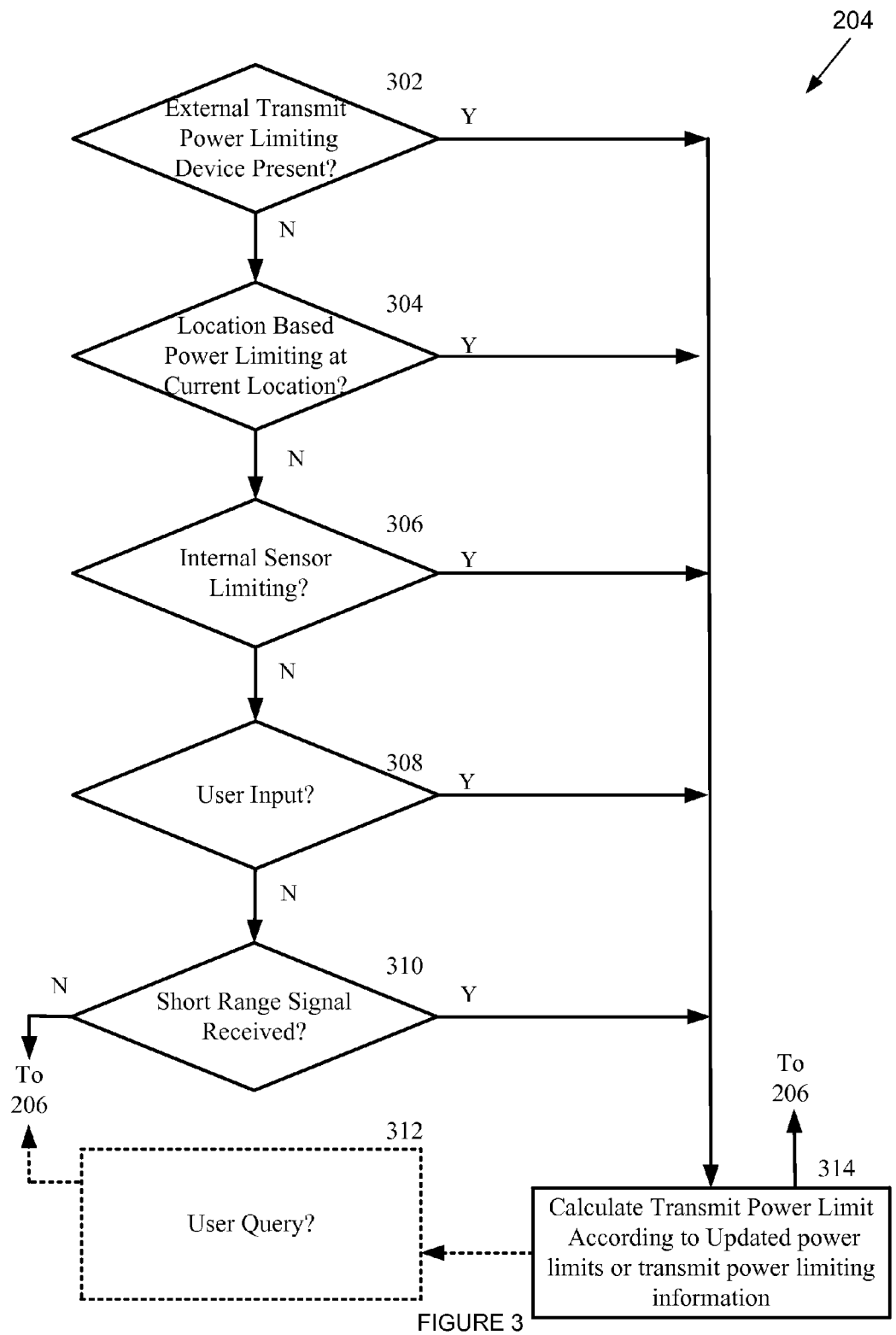
FIG. 3 is a flowchart detailing exemplary dynamic electromagnetic radiation emission control.

FIG. 3 is a flowchart detailing exemplary dynamic transmit power limit determination 204. Control flow begins in step 302 by searching for the presence an external device having a SAR limiting or transmit power limiting value. In one embodiment, the external device is an RF ID tag containing a SAR or transmit power limit. In other embodiments, the external device may be any device having a SAR or transmit power limit value available to a wireless device, without departing from the scope of the present invention. The external device may also measure and estimate the amount of electromagnetic radiation it receives from the wireless device. Such a device might be referred to as a SAR measurer. If the amount of electromagnetic radiation it measures exceeds a threshold, the SAR measurer transmits a signal (over short-range wireless e.g. Bluetooth or NFC) to the wireless device indicating the measured radiation level or the desired transmit power limit. If an external device is detected, control flow proceeds to step 314, where a transmit power limit is calculated from a SAR value or any other processing required to translate the detected information into a transmit power limit for the wireless device is performed. Otherwise, control flow proceeds to step 304.

In step 304, location based transmit power limiting is determined for the current location of the wireless device. In one embodiment a GPS location in conjunction with data base information received from a base station or other access node is correlated to determine location sensitivity to electromagnetic radiation. In other embodiments, any method for determining location sensitivity maybe implemented without departing from the scope of the present invention. If location sensitivity is determined, control flow proceeds to step 314, where a transmit power limit is calculated from an appropriate SAR value for the location or any other processing required to translate the location information into a transmit power limit for the wireless device is performed. Otherwise, control flow proceeds to step 306.

In step 306, if internal human proximity sensors are incorporated in the wireless device, human proximity detection is performed. Human proximity detection may be based on one or more of infrared sensors, capacitance sensor, resistive sensor, etc. Transmit power may be limited based proximity. In other embodiments, any method for determining human proximity maybe implemented without departing from the scope of the present invention. If human proximity is determined, control flow proceeds to step 314, where a transmit power limit is calculated from an appropriate SAR value for the proximity or any other processing required to translate the proximity information into a transmit power limit for the wireless device is performed. Otherwise, control flow proceeds to step 308.

In step 308, user input is polled or otherwise looked for via a menu or other feature of the wireless device. If a user has requested an increase or decrease in transmit power, control flow proceeds to step 314, where a transmit power limit is calculated from the user input or any other processing required to translate the user input into a transmit power limit for the wireless device is performed. Otherwise, control flow proceeds to step 310.

In step 310, signals actively received by the wireless device over short-range, low power technologies such as Near Field Communications (NFC) or Bluetooth are processed for SAR values or transmit power limiting information. If such signals having transmit power limiting information are received, control flow proceeds to step 314, where a transmit power limit is calculated from the received signal or any other processing required to translate the received information into a transmit power limit for the wireless device is performed. Otherwise, control flow returns to step 206 of FIG. 2 with indication that no increase or decrease to the current transmit power limit is necessary.

In step 314, a new transmit power limit specific to the wireless device is calculated according to updated transmit power limits or transmit power limiting information determined in steps 302-310. Control flow may proceed to optional step 312, where the user is queried for permission to change the power limit. The user may accept or decline a new power limit and control flow returns to step 206 of FIG. 2 indicating an accepted increase or decrease, or no change, to the current transmit power limit is necessary. If optional step 312 is not implemented, control flow control flow returns to step 206 of FIG. 2 with indication that of an increase or decrease, to the current transmit power limit and transmit power is necessary.

Figure 4:
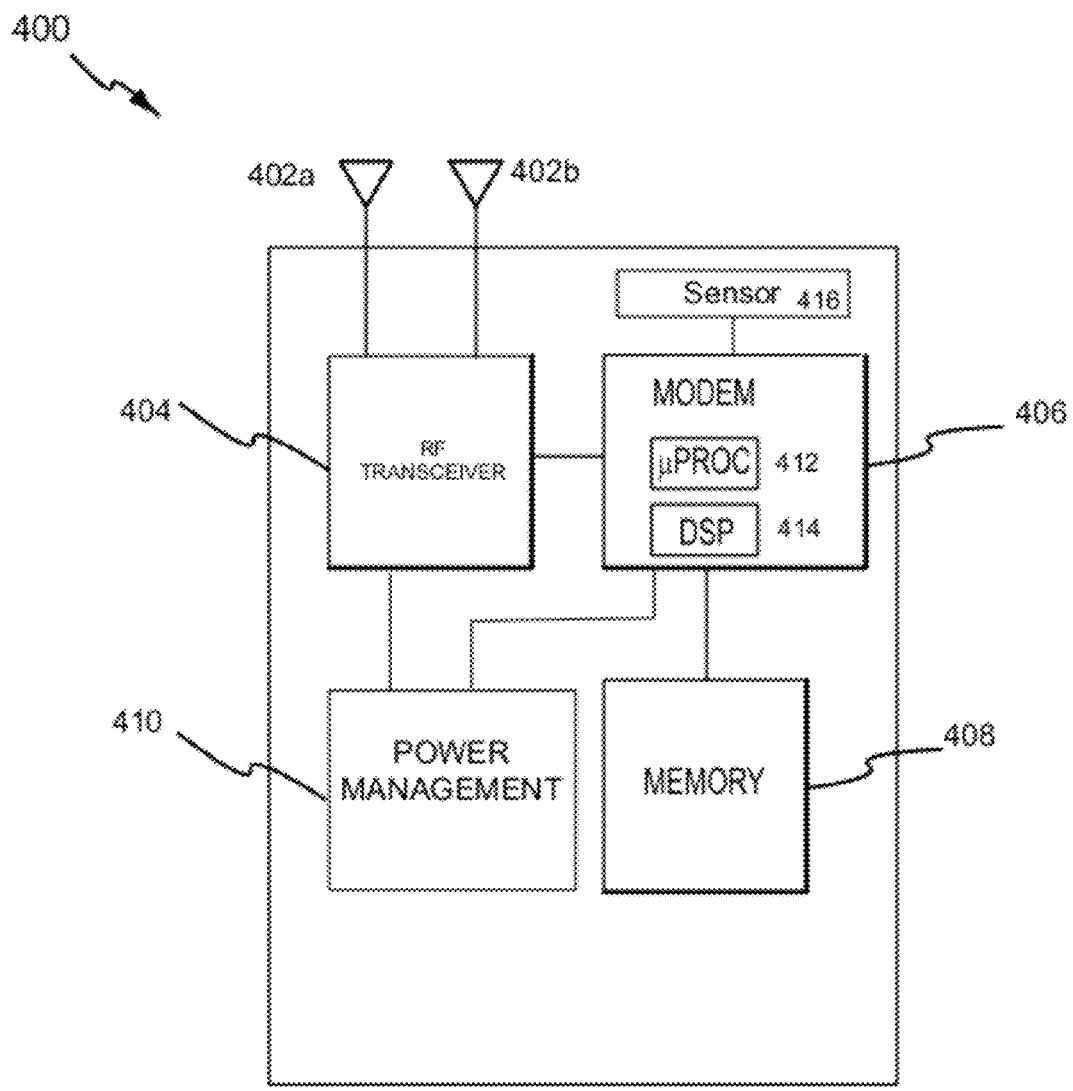
FIG. 4 is a high level block diagram of an exemplary hardware implementation capable of dynamic electromagnetic radiation emission control.

FIG. 4 is a block diagram illustrating an exemplary wireless device capable of dynamic electromagnetic radiation emission control 400. Wireless device 400 comprises a wireless communication RF transceiver 404 and associated antennas 402a, 402b capable of sending and receiving wireless communication signals. Modem 406 comprises the appropriate microprocessor(s) 412, digital signal processor(s) 414 and other suitable hardware, such as a correlator bank, for processing signals. Power management 410 controls power for various components of wireless device 400. Memory 408 is coupled to modem 404 as necessary for implementing various modem processes and functionality for dynamic electromagnetic radiation emission control. Wireless device 400 may comprise an appropriate user interface with alphanumeric keypad, display, microphone, speaker, and other necessary components (not shown). Optional sensor 416 may comprise on one or more of thermal sensor, infrared sensors, capacitance sensor, resistive sensor, etc. for human proximity detection. It will be appreciated by those skilled in the art that wireless device 400 may comprise a variety of components not shown.

The methodology for dynamic electromagnetic radiation emission control described herein may be implemented by suitable instructions operating on the microprocessor 412 and memory 408 of wireless device 400, but is certainly not limited to such an implementation and may alternatively be implemented in hardware circuitry. The microprocessor 412 is connected to power management 410 and memory 408 having code or instructions directing the microprocessor 412 to perform dynamic electromagnetic radiation emission control. Memory 408 may comprise instructions for performing dynamic electromagnetic radiation emission control. The memory 408 may include RAM memory, flash memory, ROM memory, EPROM memory, EEPROM memory, registers, a hard disk, a removable disk, a CD-ROM, or any other form of storage medium or computer readable media known in the art. In an exemplary aspect, the control processor 412 executes instructions stored in memory 408 according to the steps of FIGS. 2-3 to perform dynamic electromagnetic radiation emission control.

Novel features of this invention thus comprise variable and dynamic control of electromagnetic radiation emissions from wireless devices by controlling transmit power limits through the use of RF ID/NFC tags that indicate transmit power limits, where such power limiting tags are embedded in clothing, furniture, etc., communication of power limits over Bluetooth or other short range technologies, location-based transmit power limits, and controlling the transmit power of mobiles as well as femtocells/access points for the purpose of minimizing SAR.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. Method steps can be interchanged without departing from the scope of the invention. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for controlling electromagnetic radiation emissions from wireless devices comprising:
    dynamically determining a variable transmit power limit;
    increasing or decreasing a current variable transmit power limit; and
    adjusting transmit power of a wireless device according to the current variable transmit power limit to control electromagnetic radiation emissions from the wireless device;
    wherein dynamically determining a variable transmit power limit comprise at least one of:
    searching for SAR or transmit power limit information from an external device; and
    actively receiving signals by the wireless device over short-range, low power technologies which are processed for SAR or transmit power limit information.

2. The method of claim 1 wherein the external device comprises a Radio Frequency Identification tag.

3. The method of claim 1 wherein short-range, low power technologies comprise Bluetooth or Near Field Communications technologies.

4. The method of claim 1 wherein the external device measures an amount of electromagnetic radiation it receives from the wireless device and if the measured amount of electromagnetic radiation exceeds a threshold, the wireless devices receives a signal from the external device indicating the measured radiation level or the desired transmit power limit.

5. A wireless device comprising:
    a wireless communications transceiver and associated antenna(s) capable of sending and receiving wireless communications signals;
    a modem coupled to the transceiver comprising processor(s) for processing signals and executing code stored in a memory;
    a power management unit coupled to the modem and the transceiver for measuring and controlling transmit power; and
    a memory coupled to the modem for storing instructions for dynamically determining a variable transmit power limit, increasing or decreasing a current variable transmit power limit and adjusting transmit power of a wireless device according to the current variable transmit power limit to control electromagnetic radiation emissions from the wireless device;
    wherein dynamically determining a variable transmit power limit comprise at least one of:
    searching for SAR or transmit power limit information from an external device; and
    actively receiving signals by the wireless device over short-range, low power technologies which are processed for SAR or transmit power limit information.

6. The wireless device of claim 5 wherein the external device comprises a Radio Frequency Identification tag.

7. The wireless device of claim 5 wherein short-range, low power technologies comprise Bluetooth or Near Field Communications technologies.

8. A computer readable medium having instructions stored thereon to cause a processor in a wireless device to:
    dynamically determine a variable transmit power limit;
    increase or decrease a current variable transmit power limit; and
    adjust transmit power of a wireless device according to the current variable transmit power limit to control electromagnetic radiation emissions from the wireless device;
    wherein dynamically determining a variable transmit power limit comprise at least one of:
    searching for SAR or transmit power limit information from an external device; and
    actively receiving signals by the wireless device over short-range, low power technologies which are processed for SAR or transmit power limit information.

9. The computer readable medium of claim 8 wherein the external device comprises a Radio Frequency Identification tag.

10. The method of computer readable medium 8 wherein short-range, low power technologies comprise Bluetooth or Near Field Communications technologies.

11. An apparatus for controlling electromagnetic radiation emissions from wireless devices comprising:
    means for dynamically determining a variable transmit power limit;
    means for increasing or decreasing a current variable transmit power limit; and
    means for adjusting transmit power of a wireless device according to the current variable transmit power limit to control electromagnetic radiation emissions from the wireless device;
    wherein dynamically determining a variable transmit power limit comprise at least one of:
    searching for SAR or transmit power limit information from an external device; and actively receiving signals by the wireless device over short-range, low power technologies which are processed for SAR or transmit power limit information.

12. The apparatus for controlling electromagnetic radiation emissions from wireless devices of claim 11 wherein the external device comprises a Radio Frequency Identification tag.

13. The apparatus for controlling electromagnetic radiation emissions from wireless devices of claim 11 wherein short-range, low power technologies comprise Bluetooth or Near Field Communications technologies.

* * * * *